(12) United States Patent
Baltrucki et al.

(10) Patent No.: US 11,149,599 B2
(45) Date of Patent: Oct. 19, 2021

(54) SYSTEMS AND METHODS FOR IEGR USING SECONDARY INTAKE VALVE MOTION AND LOST-MOTION RESET

(71) Applicant: Jacobs Vehicle Systems, Inc., Bloomfield, CT (US)

(72) Inventors: Justin D. Baltrucki, Canton, CT (US); John A. Schwoerer, Storrs Mansfield, CT (US)

(73) Assignee: JACOBS VEHICLE SYSTEMS, INC., Bloomfield, CT (US)

( * ) Notice: Subject to any disclaimer, the term of this patent is extended or adjusted under 35 U.S.C. 154(b) by 0 days.

(21) Appl. No.: 16/364,355

(22) Filed: Mar. 26, 2019

(65) Prior Publication Data

US 2019/0293001 A1 Sep. 26, 2019

Related U.S. Application Data

(60) Provisional application No. 62/648,106, filed on Mar. 26, 2018.

(51) Int. Cl.
*F01L 13/06* (2006.01)
*F02D 13/02* (2006.01)
(Continued)

(52) U.S. Cl.
CPC ............. *F01L 13/065* (2013.01); *F01L 1/181* (2013.01); *F01L 9/14* (2021.01); *F02D 13/0203* (2013.01); *F01L 1/08* (2013.01); *F01L 2800/10* (2013.01)

(58) Field of Classification Search
CPC ............. F02D 13/0203; F02D 41/006; F02D 13/0273; F02D 13/04; F01L 1/08;
(Continued)

(56) References Cited

U.S. PATENT DOCUMENTS 6,439,195 B1 * 8/2002 Warner .................. F02D 13/04
123/321
7,905,208 B2 * 3/2011 Ruggiero .................. F01L 1/08
123/90.12
(Continued)

FOREIGN PATENT DOCUMENTS

WO WO-02101212 A2 * 12/2002 .............. F01L 13/06
WO 03087544 A2 10/2003

OTHER PUBLICATIONS

S.P. Edwards et al., "The Potential of a Combined Miller Cycle and Internal EGR Engine for Future Heavy Duty Truck Applications," SAE Transactions, vol. 107, Section 3: Journal of Engines (1998), pp. 355-373.
(Continued)

*Primary Examiner* — Patrick Hamo
*Assistant Examiner* — Wesley G Harris
(74) *Attorney, Agent, or Firm* — Moreno IP Law LLC

(57) ABSTRACT

Systems and methods for internal exhaust gas recirculation (iEGR) in internal combustion engines may utilize secondary intake valve lift events during an exhaust valve main event in lost motion valve actuation systems. The secondary intake valve lift event may occur at the beginning or end of the exhaust valve main event. Favorable intake valve lift profiles are obtained with the use of a reset component, which may perform a hydraulic reset on the lost motion component in order to ensure that the intake valve secondary lift event occurs optimally near the beginning of an exhaust valve main event. The reset component may be triggered using motion from an exhaust valvetrain, for example, by a triggering component such as a reset pad, on an exhaust rocker. The reset component may also be triggered on the basis of the intake rocker arm position, in which case a reset
(Continued)

pad that is fixed to the engine head or fixed relative to the intake rocker motion may be used.

19 Claims, 14 Drawing Sheets

(51) Int. Cl.
    *F01L 9/14*     (2021.01)
    *F01L 1/18*     (2006.01)
    *F01L 1/08*     (2006.01)
(58) Field of Classification Search
    CPC ..... F01L 2800/10; F01L 9/025; F01L 13/065; F01L 1/146; F01L 2013/105; F01L 2820/01; F01L 1/181; F01L 13/06; F01L 1/267; F01L 1/18; F01L 9/02; F01L 13/0005; F01L 1/2416
    USPC .................. 123/321, 90.16, 90.12, 90.46
    See application file for complete search history.

(56) References Cited

U.S. PATENT DOCUMENTS

| | | |
|---|---|---|
| 8,578,901 B2 | 11/2013 | Ruggiero et al. |
| 9,347,383 B2 | 5/2016 | Janak et al. |
| 2003/0024501 A1* | 2/2003 | McCarthy ............... F01L 13/06 123/321 |
| 2005/0211206 A1 | 9/2005 | Ruggiero et al. |
| 2006/0102121 A1 | 5/2006 | Kalish et al. |
| 2007/0199529 A1* | 8/2007 | Deane ..................... F01L 1/146 123/90.16 |
| 2014/0130774 A1* | 5/2014 | Le Forestier ....... F01L 13/0021 123/321 |
| 2014/0238324 A1 | 8/2014 | Janak et al. |
| 2015/0252694 A1* | 9/2015 | Gustafson ............... F01L 13/06 123/321 |
| 2016/0069229 A1 | 5/2016 | Baltrucki et al. |
| 2016/0146074 A1* | 5/2016 | Lynch .................... F01L 13/06 123/90.11 |

OTHER PUBLICATIONS

International Search Report and Written Opinion of the International Search Authority for International Application No. PCT/US2019/023979 dated Jun. 25, 2019, 8 pages.

* cited by examiner

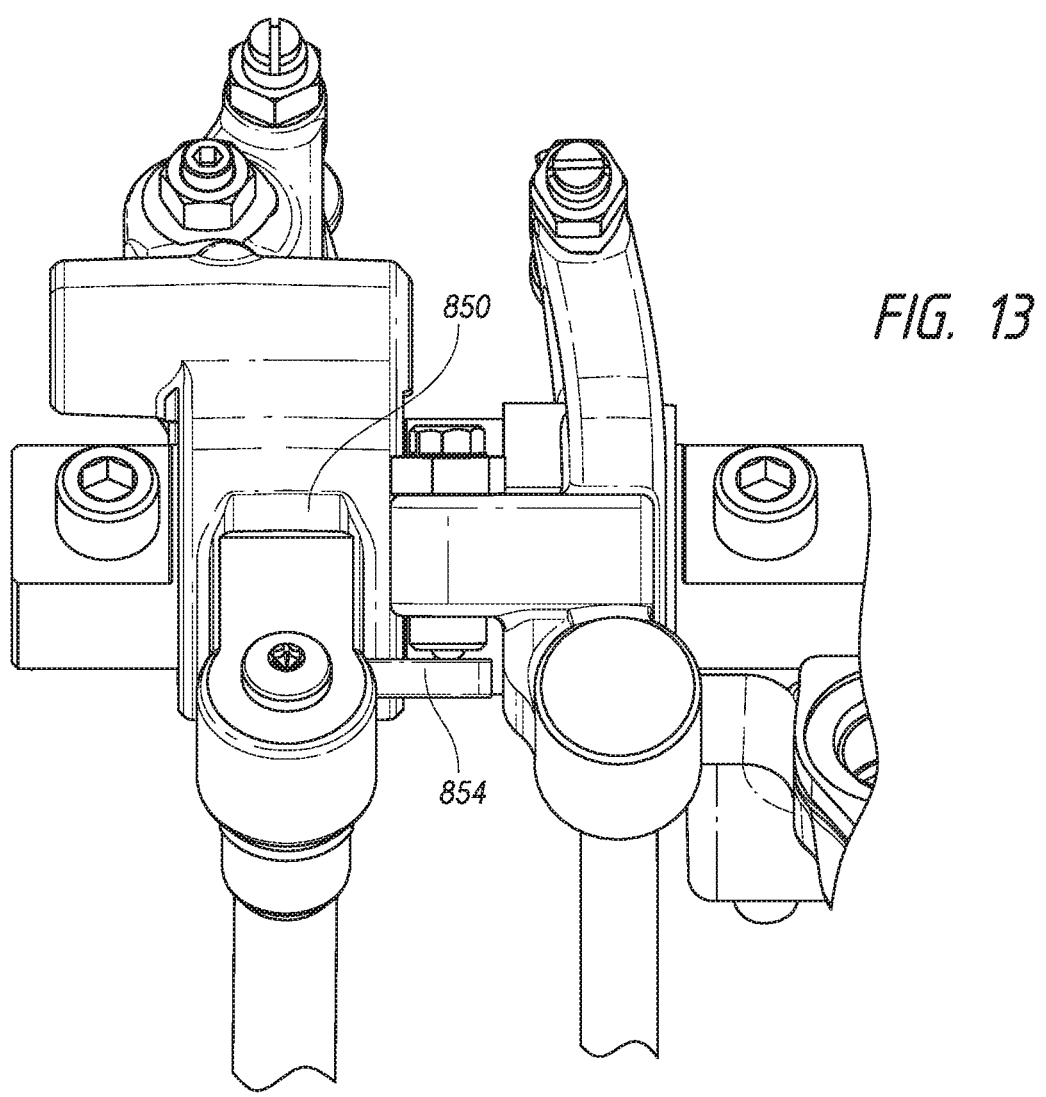
FIG. 13
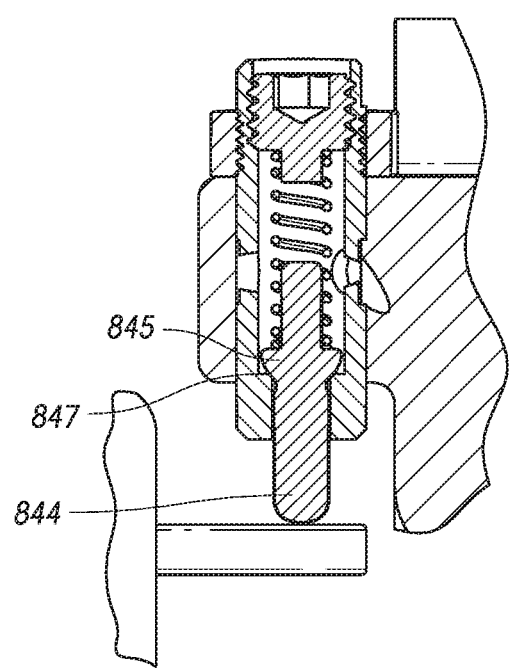
FIG. 13.1

SYSTEMS AND METHODS FOR IEGR USING SECONDARY INTAKE VALVE MOTION AND LOST-MOTION RESET

PRIORITY CLAIM AND CROSS-REFERENCE TO RELATED APPLICATIONS

This application claims the priority benefit of U.S. provisional application Ser. No. 62/648,106, titled SYSTEM AND METHOD FOR ADDITIONAL INTAKE OPENING FOR IEGR, filed on Mar. 26, 2018, the subject matter of which is incorporated by reference herein in its entirety.

FIELD

This disclosure relates generally to systems and methods for managing combustion engine emissions and controlling exhaust gas recirculation. More particularly, this disclosure relates to systems and methods for internal exhaust gas recirculation, including systems and methods for actuating one or more engine valves to facilitate the flow of residual exhaust gases from the intake or exhaust manifold into the combustion chamber.

BACKGROUND

Internal combustion engines rely on valve actuation systems to control engine intake and exhaust valves, which in turn, control the flow of combustion components and products into and out of combustion chambers during operation. In a four-stroke operating cycle, intake valves are opened to admit fuel and air into an expanding combustion chamber during an intake stroke of a piston moving within a cylinder. In a compression stroke, the intake valves are closed and combustion components are compressed by the piston. The compressed combustion components are then ignited, causing a power stroke of the piston. In an exhaust stroke, exhaust valves are opened to allow combustion products to escape the cylinder as the piston is displaced therein. This operation is typically called a "positive power" operation of the engine and the motions applied to the valves during positive power operation are typically referred to as "main event" valve actuation motions. In addition to main event actuation, engine valve actuation systems may include features that facilitate auxiliary valve actuation motion to support functions such as engine braking (power absorbing), exhaust gas recirculation (EGR) and others. Such valve motion may be accomplished using "auxiliary" events imparted to one or more of the engine valves.

Valve movement is typically controlled by one or more rotating cams as motion sources. Cam followers, push rods, rocker arms and other elements, which may form a valvetrain, provide for direct transfer of motion from the cam surface to the valves. For auxiliary events, "lost motion" devices or variable length actuators may be utilized in the valvetrain to facilitate auxiliary event valve movement. Lost motion devices refer to a class of technical solutions in which valve motion is modified compared to the motion that would otherwise occur as a result of actuation by a respective cam surface alone. Lost motion devices may include devices whose length, rigidity or compressibility is varied and controlled in order to facilitate the selective occurrence of auxiliary events in addition to, or as an alternative to, main event operation of valves.

EGR systems typically provide for a portion of exhaust gases to flow back into the engine combustion chamber during positive power operation. The presence of residual exhaust gases in the combustion chamber during combustion typically reduces the concentration of nitrogen oxide (NOx) in engine emissions overall and may provide other benefits in engine operation. An external EGR (EEGR) system may route exhaust gases back to the combustion chamber by way of one or more external passages that communicate with the exhaust manifold or other part of the exhaust system. An internal EGR system (iEGR) typically provides for the introduction of exhaust gases into the combustion chamber without the use of external conduits, for example, by providing appropriate motion to one or more engine valves at the appropriate time during the engine cycle. Such systems may provide for recirculation of exhaust gases using a secondary opening of an intake valve during an exhaust event in a four-stroke engine cycle and/or the secondary opening of an exhaust valve during the intake portion of a four-stroke engine cycle.

As is described in the SAE Technical Paper 98010, 1998, titled "The Potential of a Combined Miller Cycle and Internal EGR Engine of Future Heavy Duty Truck Applications" by Edwards, S., Frankle, G., Wirbeleit, F., and Raab, A., ("Edwards et al.") the residual percentage of exhaust gas can be controlled with secondary exhaust valve lift events and secondary intake valve lift events. This publication describes and graphically illustrates variation of in-cylinder and port pressures in the engine operating cycle as a function of crankshaft angle. Three potential stages in the engine operating cycle are identified as presenting opportunities for iEGR. The publication further describes prior art results of secondary exhaust valve lift profiles and secondary intake valve lift profiles on residual exhaust gas percentage. From these results, it is known that an additional intake event timed near the beginning of exhaust valve opening can provide EGR level percentages that are equivalent to using an exhaust opening event during the intake.

Thus, two viable methods for iEGR include a secondary intake valve "bump" during the exhaust valve main event motion, and a secondary exhaust valve "bump" during an intake valve main event motion. They offer similar iEGR percentages (residual gas ratios). An intake valve bump during an exhaust valve main event produces backflow of burnt gas to the intake manifold, where it mixes with intake gases, and flows back into the engine cylinder during the subsequent main intake stroke. An exhaust valve bump during an intake valve main event produces backflow of burnt gas from the exhaust manifold into the engine cylinder.

Known iEGR systems and methods require dedicated equipment to provide for valve operation and thus increase costs. It would therefore be advantageous to provide systems that address the aforementioned shortcoming and others in the prior art.

SUMMARY

Responsive to the foregoing challenges, the instant disclosure provides various embodiments of valve actuation systems that may be used to implement iEGR by facilitating secondary motion of valves, including opening and closing, at appropriate times in the engine operating cycle to achieve the above-described advantages.

According to an aspect, the disclosure describes systems for providing on/off control of secondary intake valve lift events during or in temporal proximity to an exhaust valve main event in lost motion valve actuation systems in order to achieve iEGR. The secondary intake valve lift event may occur at the beginning or end of the exhaust valve main event. Favorable intake valve lift profiles are obtained with the use of lost-motion cam profiles and lost-motion components in the intake valvetrain, in combination with a reset component. The lost-motion cam profile may have substantially the same main event lift profile as a conventional cam and secondary lift profiles below the base circle of the conventional cam. When the lost-motion component is collapsed, the lost-motion cam profile transmits only the main event motion to the intake valves. When the lost motion component is expanded, the lost motion cam profile may provide for at least the opening portion of a secondary lift event for the intake valve at an appropriate time in the engine operating cycle. The reset component, which may perform a hydraulic reset on the lost motion component, collapses the lost-motion component an appropriate time during the engine cycle to achieve the desirable secondary intake lift profiles discussed above as well as the normal intake main event closing profile. The reset component may be triggered using motion from the exhaust valvetrain, for example, by a triggering component such as a reset pad, on an exhaust rocker. The reset component may also be triggered on the basis of the intake rocker arm position, in which case a fixed reset pad may be used.

According to an aspect, the disclosure describes a system for actuating at least one of two or more engine valves to provide exhaust gas recirculation in an internal combustion engine, the system comprising; an exhaust valve motion source; an exhaust valvetrain for conveying motion from the exhaust valve motion source to at least one exhaust valve; an intake valve motion source; an intake valvetrain for conveying motion from the intake valve motion source to at least one intake valve; a lost motion component in the intake valvetrain for selectively absorbing motion in the intake valvetrain; a control fluid circuit in communication with the lost motion component; a reset component for resetting the control fluid circuit; and a reset trigger for triggering the reset component. Reset may be triggered by the angle or position of the intake rocker or the intake valve.

According to an aspect, the disclosure describes methods for operating at least one of two or more engine valves. In an internal combustion engine comprising an exhaust valvetrain for conveying motion from an exhaust valve motion source to at least one exhaust valve; an intake valve motion source; an intake valvetrain for conveying motion from an intake valve motion source to at least one intake valve; a lost motion component in the intake valvetrain for selectively absorbing motion in the intake valvetrain; a control fluid circuit in communication with the lost motion component; a reset component for resetting the control fluid circuit; and a reset trigger for triggering the reset component, a method in accordance with the instant disclosure comprises: opening the exhaust valve during a main event power cycle of the engine; opening an intake valve to cause a secondary lift event during the exhaust valve opening; and operating the reset trigger to control the secondary intake valve lift during main event opening of the exhaust valve.

Other aspects and advantages of the disclosure will be apparent to those of ordinary skill from the detailed description that follows and the above aspects should not be viewed as exhaustive or limiting. The foregoing general description and the following detailed description are intended to provide examples of the inventive aspects of this disclosure and should in no way be construed as limiting or restrictive of the scope defined in the appended claims.

DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples according to aspects of the disclosure and are not intended to be limiting to the scope of invention, which is set forth in the claims appended hereto.

FIG. 13 is an isometric view of the iEGR system of FIG. 8 in a main event peak reset position in which the reset component is depressed or activated. FIG. 13.1 is a detailed sectional view of the reset component in the intake rocker of FIG. 13.

DETAILED DESCRIPTION

Figure 1:
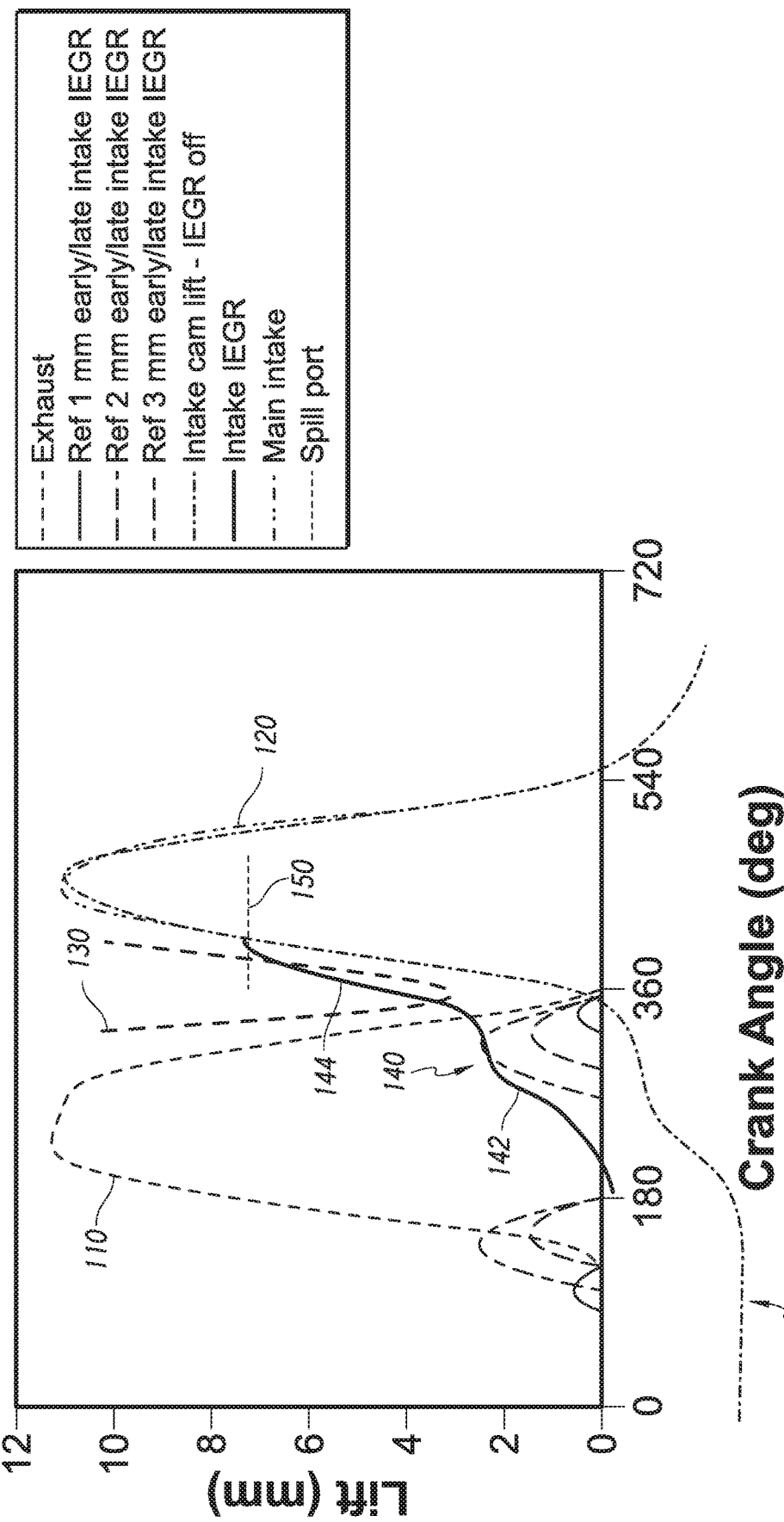
FIG. 1 is a graphical representation of valve lift as a function of crank angle showing exhaust and intake valve main event lift profiles as well as an iEGR secondary intake valve lift profile near the end of exhaust valve main event motion as may be achieved according to aspects of the instant disclosure. These profiles may be characteristic of a height-based reset that is loosely toleranced and occurs at high main event intake lift and may require larger valve-to-piston clearance.

FIG. 1 illustrates exhaust and intake main event lift profiles as well as an iEGR secondary intake valve lift profile near the end of exhaust valve main event motion as may be achieved with an intake valve height-based reset according to aspects of the instant disclosure. This may be implemented in a lost motion system which utilizes a valve height-based reset on the intake valve, such as a bridge brake configuration, an example of which is described in U.S. Pat. No. 8,578,901 (Ruggiero et al.) assigned to Jacobs Vehicle Systems, Inc. The graph depicts an exhaust valve main event profile 110, an intake valve main event profile 120, and an engine piston displacement profile 130 showing allowable engine valve lift for representative valve-to-piston clearance. The position (lift) of these elements as a function of crankshaft angle defines their respective profiles. A lost-motion cam profile may include sub-base circle features, generally referenced at 122, to provide for a late intake iEGR lift profile, such as those identified by Edwards et al as described above. This curve represents cam lift that is lost when the lost-motion component in the intake valvetrain is deactivated ("iEGR off"). According to an aspect of the present disclosure, an iEGR system may provide for a valve height-based reset by means of the opening of a spill port, represented at 150, in a control fluid circuit associated with a lost-motion component in the intake valvetrain (i.e., in the intake rocker). The profile may include transition portion 144 extending from the lift event 142 portion to the intake valve main event profile 120. The transition from 144 to the main event 120 is due to spilling of hydraulic fluid from the control fluid circuit, resulting in reset of the lost-motion element. The overlap of transition portion 144 with the piston displacement profile 130 may be addressed with a pocket machined in the piston and coinciding with the intake valve location in order to maintain valve to piston clearance. As will be recognized, in this configuration, reset of the intake valve motion may begin just above the iEGR lift event portion 142 and can be controlled to a specific height. As will be recognized, this configuration may require a relatively high intake valve lift to achieve a full reset. For example, intake valve lift of about twice the lost motion peak lift may be required to achieve full reset.

Figure 2:
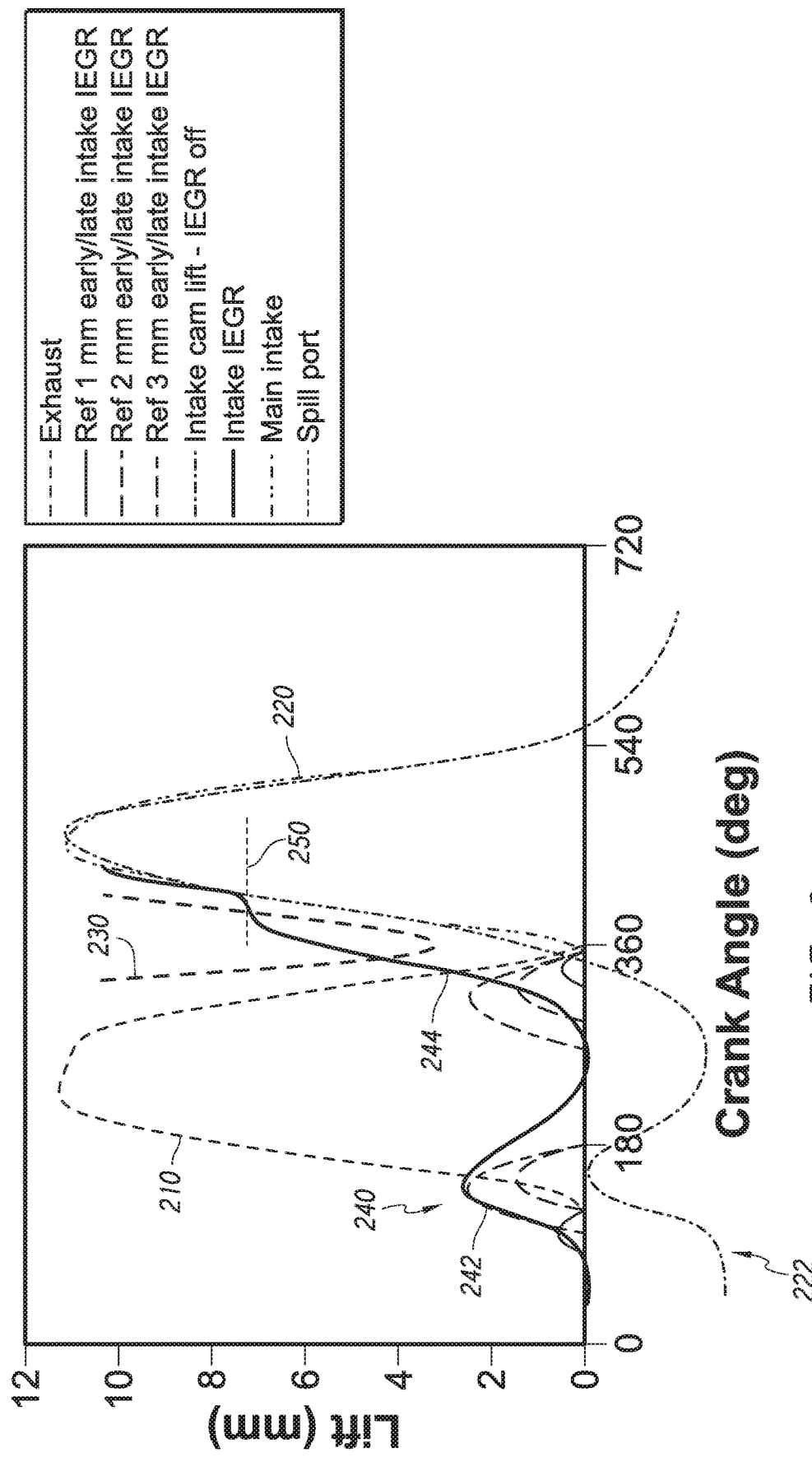
FIG. 2 is a graphical representation of valve lift as a function of crank angle showing exhaust and intake main valve event lift profiles as well as an iEGR secondary intake valve lift profile at the beginning of exhaust valve main event motion as may be achieved according to aspects of the instant disclosure. These profiles may be characteristic of a height-based reset that is loosely toleranced and occurs at high main event intake lift and may require larger valve-to-piston clearance.

FIG. 2 illustrates exhaust and intake main event lift profiles as well as an iEGR secondary intake valve lift profile at the beginning of exhaust valve main event motion as may be achieved with an intake valve height-based reset according to aspects of the instant disclosure. A lost-motion cam profile may include sub-base circle features, generally referenced at 222 to provide for an iEGR bump. This curve represents cam lift that is lost when the lost-motion component in the intake valvetrain is deactivated ("iEGR off"). In this example, a valve height-based reset may provide an intake iEGR event in the region of the early intake iEGR lift profiles identified by Edwards et al as described above. As with FIG. 1, this may be implemented in a lost motion system which utilizes a valve height-based reset on the intake valve, such as a bridge brake configuration. According to an aspect of the present disclosure, an iEGR system may provide for a valve height-based reset by means of the opening of a spill port, represented at 250, in a control fluid circuit associated with a lost-motion component in the intake valvetrain (i.e., in the intake rocker). As will be recognized, this system is similar to that depicted in FIG. 1 except that a different lost motion cam profile may be used. The graph depicts an exhaust valve main event profile 210, an intake valve main event profile 220, and a piston displacement profile 230. The position (lift) of these elements as a function of crankshaft angle defines their respective profiles. The iEGR system may provide for a valve height-based reset characterized by an iEGR intake valve lift secondary profile, generally referenced by 240, which may include an iEGR intake valve secondary lift event 242 portion. The profile may include transition portion 244 extending from the lift event 242 portion to the intake valve main event profile 220. As with the configuration of FIG. 1, the overlap of transition portion 244 with the piston displacement profile 230 may be addressed with a pocket machined in the piston and coinciding with the intake valve location may be provided in order to maintain valve to piston clearance. This configuration, with a secondary intake event at the beginning of the exhaust main event lift can improve EGR flow at lower intake valve lift heights. However, flow reversion may still occur at the beginning of the intake main event lift due to early opening. It should be noted that backflow from the engine cylinder to the intake port is typical of iEGR systems regardless of whether opening is early or later. Moreover, as indicated in FIG. 2, valve to piston clearance may need to accommodate about 2 mm higher opening of the intake valve at top dead center (TDC).

Figure 3:
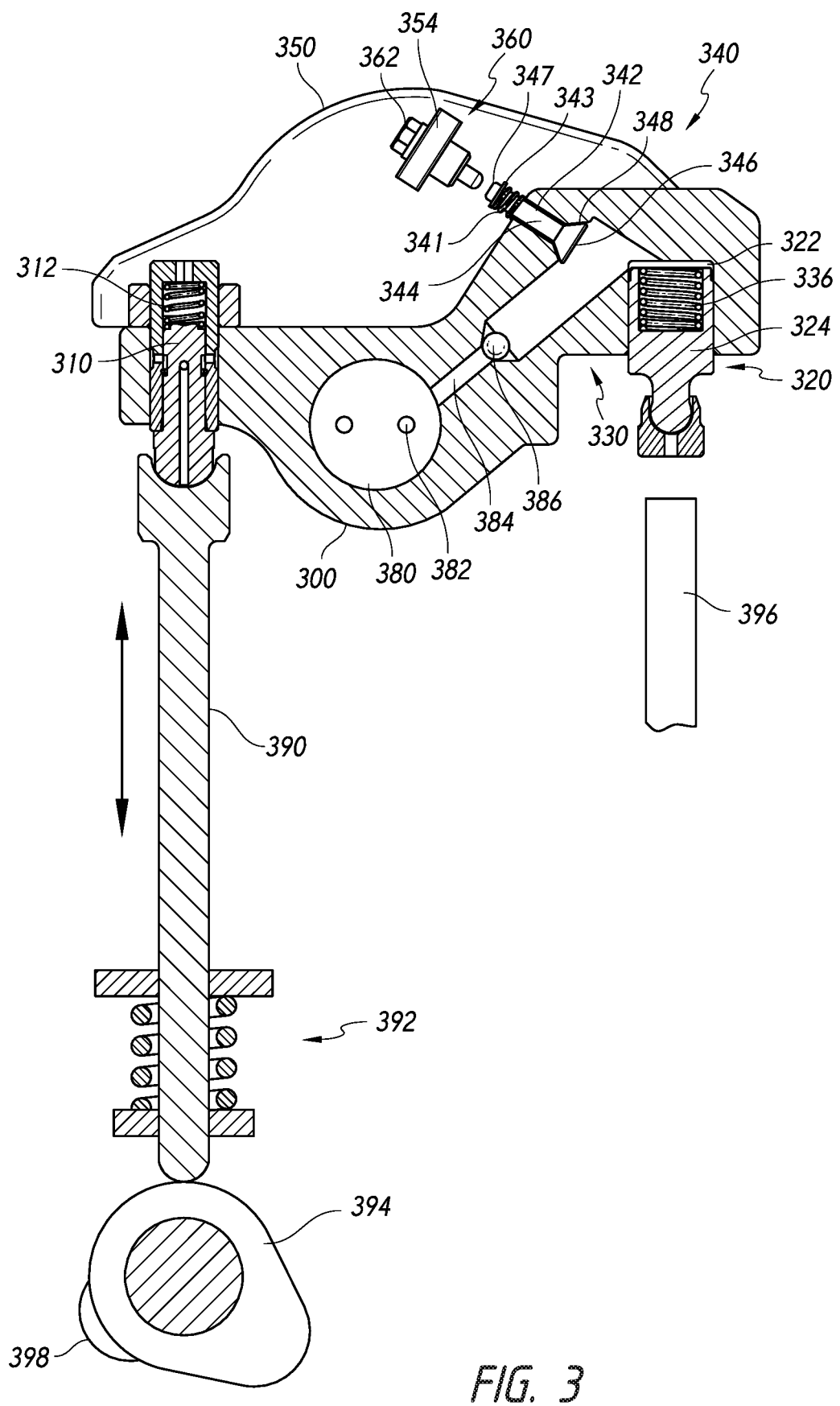
FIG. 3 is a schematic illustration of an example embodiment of an iEGR system utilizing exhaust valvetrain motion to trigger reset of an intake rocker lost motion component according to an aspect of the disclosure.

FIG. 3 is a schematic illustration of an example embodiment of an iEGR system utilizing exhaust motion to trigger reset of an intake rocker lost motion component according to an aspect of the disclosure. An intake rocker 300 and an exhaust rocker 350 may be pivotably mounted on a rocker shaft 380. Exhaust rocker 350 is partially hidden from view in FIG. 3 by the intake rocker 300. Intake rocker 300 may be part of an intake valvetrain, which may include a pushrod 390 having a pushrod biasing assembly 392 associated therewith and an adjustable biasing screw assembly 310, having a biasing spring 312, disposed within a motion source side of the intake rocker 300. Pushrod 390 and other components of the intake valvetrain may receive motion imparted thereto by an intake motion source, such as a cam 394. Cam 394 may have a lost-motion cam profile, including an iEGR lobe 398. As will be recognized, the lost-motion cam profile with front-porch sub-base circle features that provide for early opening of an intake valve with a dwell prior to the main event, along with the exhaust-based reset, may provide an intake IEGR profile in the region of the early intake IEGR lift profiles identified by Edwards et al as described above. A lost motion component 320 may be disposed in a motion receiving component side of the intake rocker 300 and may impart motion to a motion receiving component, such as an intake valve pushrod or intake valve stem 396.

Intake rocker 300 may include portions of a control fluid (hydraulic) circuit 330 for controlling the lost motion component 320. Hydraulic circuit 330 may include a control fluid source passage 382 in the rocker shaft, which is in fluid communication with a rocker control passage 384 extending within the interior of intake rocker 300 to a lost motion control fluid bore 322 for controlling the state of the lost motion component 320. In an embodiment, the lost motion component 320 further comprises a piston 324 slidably disposed within the bore 322 and a biasing spring 326. When the bore 322 is not filled with hydraulic fluid (i.e., when pressurized hydraulic fluid is not provide to the rocker control passage 384 via the control fluid source passage 382), the piston 324 can retract into the bore 322, thereby reducing length of the overall valve train and thereby preventing conveyance of any motions other than the main event motion. On the other hand, when the bore 322 is charged with hydraulic fluid, the piston 324 extends from the bore 322 such that all motions provided by the cam 394 (main and auxiliary events) are conveyed by the rocker arm 300 to the engine valve 396 until such time as a reset occurs, as described in further detail below.

According to an aspect of the disclosure, a reset component 340 is provided in communication with the hydraulic circuit 330 to facilitate reset of the lost motion component 320 in order to achieve intake valve motion reset in accordance with the iEGR motions discussed above. The reset component 340 may include a relief or spill port 342 formed in the intake rocker 300 and occupied by a poppet or tapered valve 344. Poppet valve may include a tapered head portion 346 that is seated within a correspondingly shaped valve seat 348. A stem 347 of the poppet valve 344 extends within the spill port 342, and forms an annular passage therewith to permit the escape of control fluid during a reset operation. The stem 347 extends from the rocker arm and may have a biasing assembly, such as a coil spring 341 and C-clip 343 to bias the poppet valve in a closed position. Thus, an end of the valve stem 347 protrudes from the rocker arm 350 and thereby functions as a reset actuator that extends such that it may be engaged by a reset trigger component 360 on the exhaust rocker 350. A check valve 386 in the rocker control passage 384 prevents backflow of the control fluid and ensures that control fluid escapes via the reset component 340 during a reset operation.

Exhaust rocker 350 may be part of an exhaust valvetrain, the remaining components of which are omitted in this illustration for clarity in FIG. 3. The exhaust valvetrain may receive motion imparted thereto by an exhaust motion source, which may comprise a cam (not shown in FIG. 3). According to aspects of the disclosure, an adjustable reset trigger component 360 may be secured to the exhaust valve rocker 350 to engage and trigger the reset actuator of the reset component 340 on the intake rocker when the exhaust rocker motion and intake rocker motion brings the reset trigger 360 into contact with the reset actuator. The reset trigger 360 may include a setscrew 362 cooperating with a reset pad 354, the reset pad extending from the exhaust rocker 350 in a direction that is orthogonal to the exhaust rocker plane of motion (i.e., outward from the page in FIG. 3). The setscrew 362 is preferably aligned with the reset actuator on the reset component 340 to ensure actuation of the reset as the setscrew 362 moves (i.e., reciprocates) with the exhaust rocker.

In operation, when the bore 322 is charged with hydraulic fluid and the reset is triggered, the piston 324 of the lost motion component 320 will be loaded by the valve springs (not shown) on the engine valve 396, thus generating pressure within the control fluid bore 322. Thus, when the reset component 340 is triggered, control fluid will vent from the bore 322 and the hydraulic circuit 330, via port 342, externally to the rocker or via a controlled flow passage back to the source. As will be recognized, appropriate flow characteristics of the reset component 340 may be selected for ideal reset operation. Moreover, appropriate cam dwell may be provided to ensure that the reset component does not refill prior to an intake valve main event occurring. Evacuation of the hydraulic fluid from the bore 322 causes the piston 324 to quickly retract into the bore 322 under the load of the engine valve springs, thereby effectively losing any motion that would have been picked up by extension of the lost motion component 320.

Figure 4:
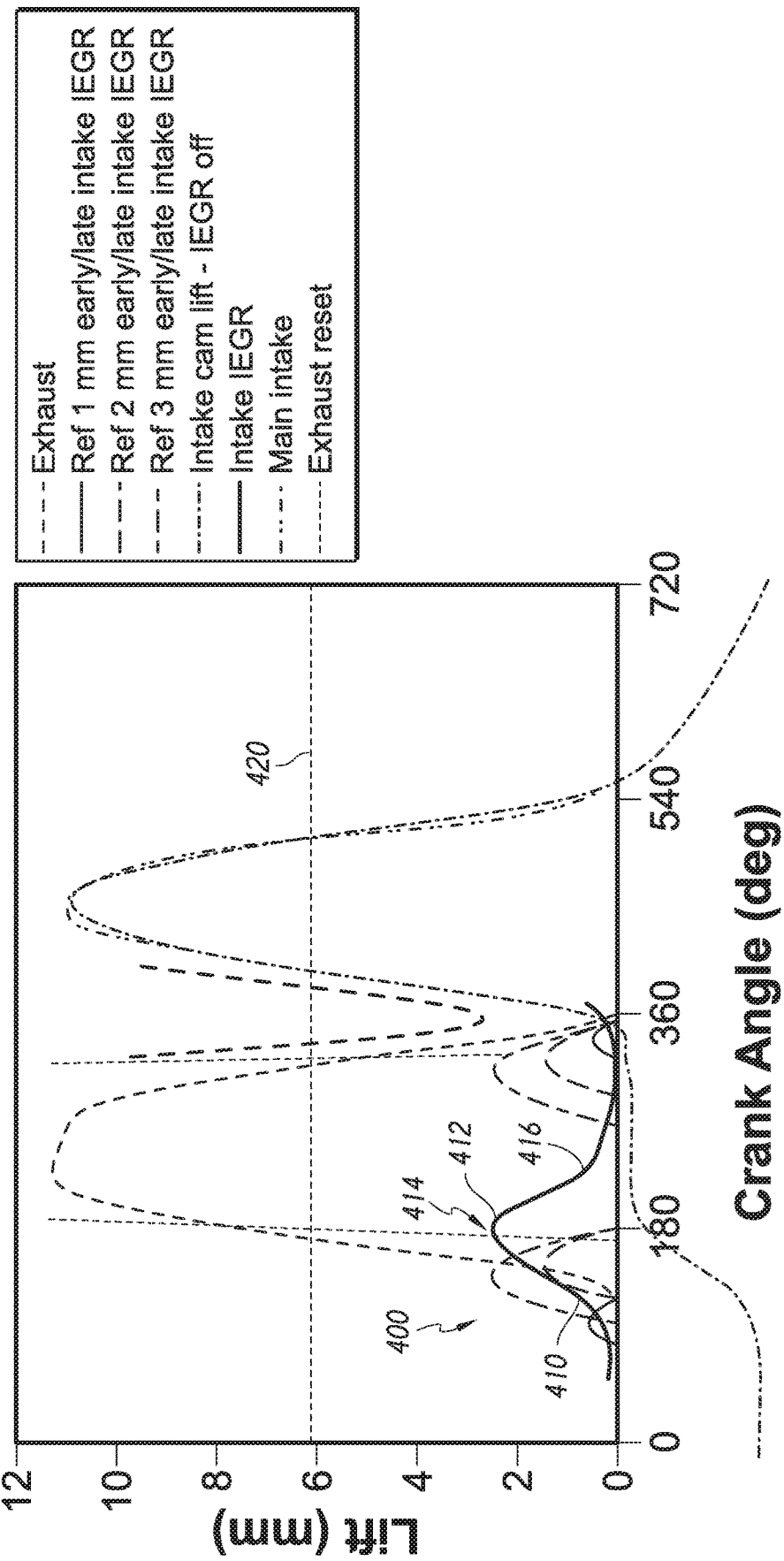
FIG. 4 is a graphical representation of valve lift as a function of crank angle showing a secondary intake valve lift event that is characteristic of the example embodiment of FIG. 3.

FIG. 4 graphically represents valve lift as a function of crank angle showing a secondary intake valve lift event that is characteristic of the example exhaust motion triggering embodiment described above with respect to FIG. 3. Using exhaust motion triggering, the secondary intake valve lift event may have a profile 400 that includes a secondary lift portion 410, a peak 412 and a reset trigger point 414, and a transition portion 416. The reset trigger point may occur at about 180 degrees of crankshaft angle with a corresponding exhaust valve lift of about 6 mm, as represented by the horizontal line 420. Reset may end around 300 degrees of crankshaft rotation. As will be recognized, using a lost-motion two-valve opening rocker brake on intake combined with using the exhaust rocker lift to trigger the reset can provide an iEGR bump at the beginning of the exhaust main event without requiring any early opening of the intake valves. A cam that has a dwell during the exhaust will be reset until it completely recloses. The reset is triggered by the exhaust lift, which is independent of intake lift and angle. As will be recognized, the high lift achieved with the exhaust rocker motion reduces the need for tight tolerances in the reset component constituent parts. In addition, the use of exhaust rocker motion may ensure a sufficiently high lift of the reset component to achieve high flow and to rapidly reset the valve motion before main event intake opening.

Figure 5:
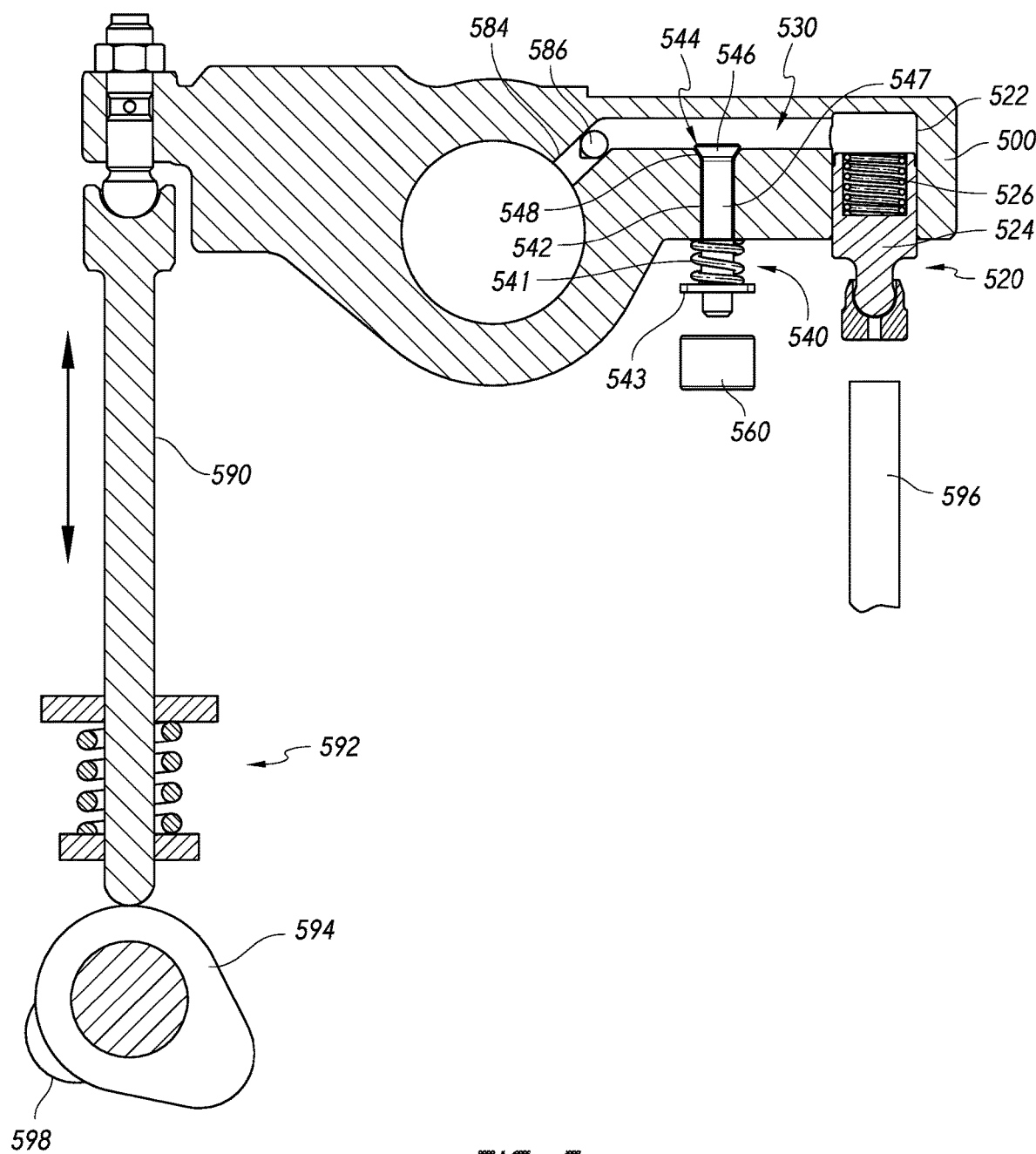
FIG. 5 is a schematic illustration of an example embodiment of an iEGR system utilizing a fixed element to trigger reset of an intake rocker lost motion component based on intake rocker angle according to an aspect of the disclosure.

FIG. 5 is a schematic illustration of another example embodiment of an iEGR system utilizing a fixed position reset trigger, which provides reset based on the angular position (i.e., lift angle) of the rocker arm. According to an aspect of the disclosure, a reset component 540 is provided in communication with the hydraulic circuit 530 to effectuate reset of the lost motion component 520 in order to achieve intake valve motion reset in accordance with the iEGR motions discussed above. In an embodiment, the lost motion component 520 further comprises a piston 524 slidably disposed within a bore 522 and a biasing spring 526. The reset component 540 may include a relief or spill port 542 formed in the intake rocker 500 and occupied by a poppet or tapered valve 544. Poppet valve may include a tapered head portion 546 that is seated within a correspondingly shaped valve seat 548. A stem 547 of the poppet valve 544 extends within the spill port 542, and forms an annular passage therewith to permit the escape of control fluid during a reset operation. The stem 547 extends from the rocker arm and may have a biasing assembly, such as a coil spring 541 and C-clip 543 to bias the poppet valve in a closed position. Thus, an end of the valve stem 547 protrudes from the rocker arm 550 and thereby functions as a reset actuator that extends such that it may be engaged by a fixed reset trigger component 560, which may be a reset pad that is fixed relative to the engine head or relative to the rocker motion. Reset thus occurs based on the angular position of the intake rocker 500. A check valve 586 in the rocker control passage 584 prevents backflow of the control fluid and ensures that control fluid escapes via the reset component 540 during a reset operation. A pushrod 590 and other components of the intake valvetrain may receive motion imparted thereto by an intake motion source, such as a cam 594. Cam 594 may have a lost-motion cam profile, including an iEGR lobe 598. As will be recognized, the lost-motion cam profile with features that provide for early opening of an intake valve with a dwell prior to the main event, along with the exhaust-based reset, may provide an intake IEGR profile in the region of the early intake IEGR lift profiles identified by Edwards et al as described above. A lost motion component 520 may be disposed in a motion receiving component side of the intake rocker 500 and may impart motion to a motion receiving component, such as an intake valve pushrod or intake valve stem 596.

Figure 6:
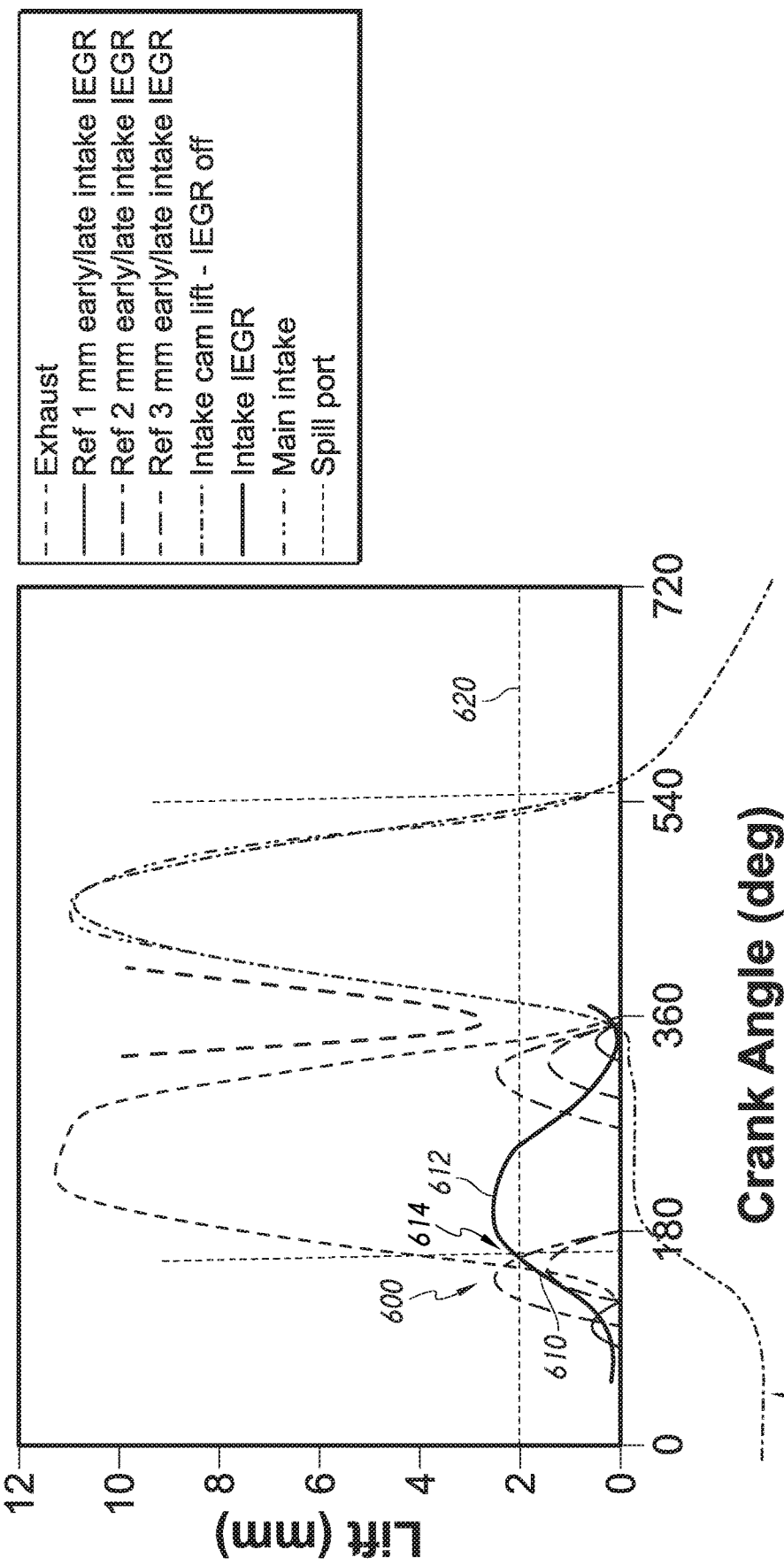
FIG. 6 is a graphical representation of valve lift as a function of crank angle showing a secondary intake valve lift event that is characteristic of the example embodiment of FIG. 5. These profiles may be characteristic of a height-based reset in which the lift is low and may require a tight tolerance.

FIG. 6 graphically represents valve lift as a function of crank angle showing a secondary intake valve lift event that is characteristic of the example exhaust motion triggering embodiment described above with respect to FIG. 5. A lost-motion cam profile may include sub-base circle features, generally referenced at 622, to provide for either early or late intake IEGR lift profiles, such as those identified by Edwards et al as described above. This curve represents cam lift that is lost when the lost-motion component in the intake valvetrain is deactivated ("iEGR off"). Using triggering based on the angular position of the intake rocker, the secondary intake valve lift event may have a profile 600 that includes a secondary lift portion 610, a peak 612 and a reset trigger point 614. When the intake rocker rotates to an angular position corresponding to approximately 2 mm of intake valve lift, as represented by horizontal line 620, the poppet valve reset actuator on the underside of the rocker arm makes contact with the reset pad 560 (FIG. 5) on the cylinder head, opening the spill port. During cam dwell, the actuator piston will retract and reset the oil in the circuit until the valves re-close. The reset position may be controlled tightly to guarantee that it functions and to prevent reset from being delayed until the higher lift main event begins.

Figure 7:
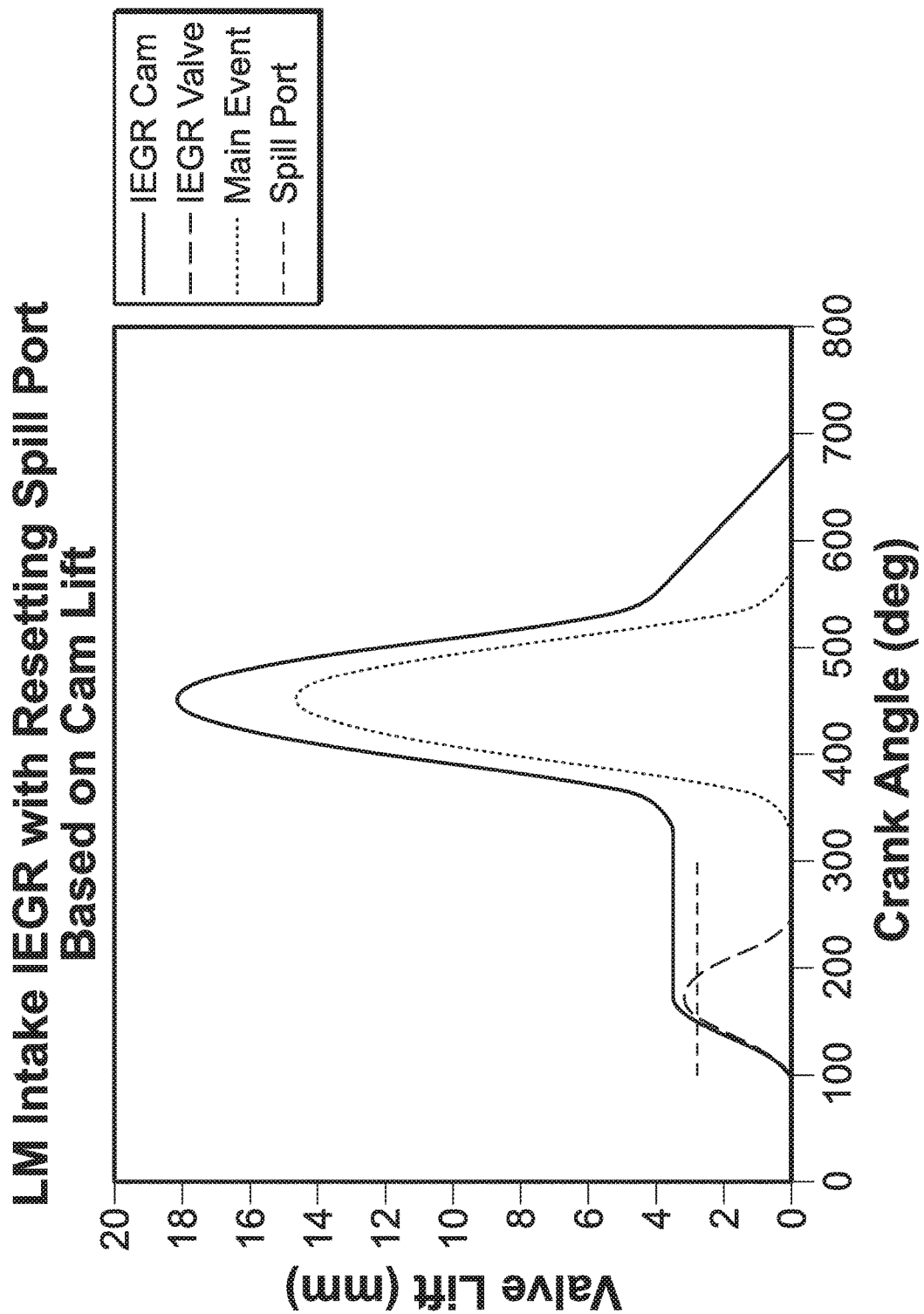
FIG. 7 is a graphical representation of valve lift as a function of crank angle showing a secondary intake valve lift event that is characteristic of the example embodiment of FIG. 5 and indicating a spill port opening event.

FIG. 7 is another graphical representation of valve lift as a function of crank angle showing a secondary intake valve lift event that is characteristic of the example embodiment of FIG. 5 and indicating a spill port opening event. This figure is similar in substance to FIG. 6, except that the background profiles have been eliminated for clarity.

Figure 8:
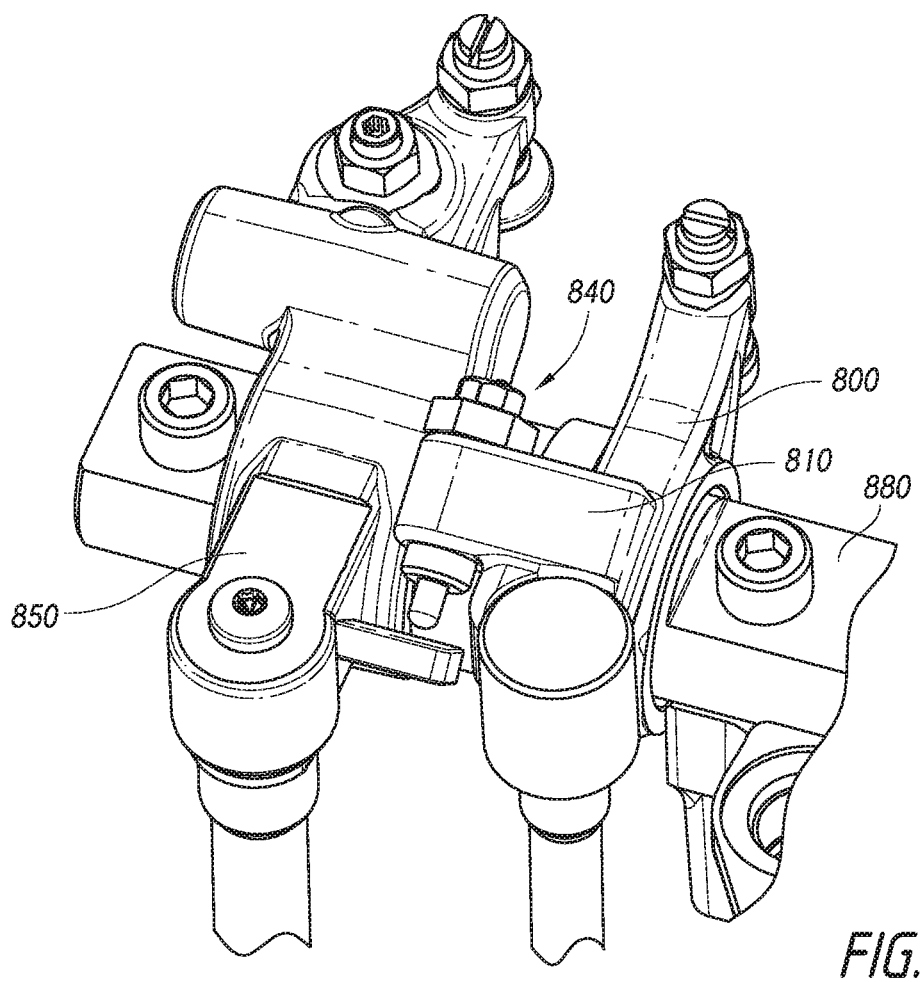
FIG. 8 is an isometric view of an iEGR system including an intake rocker with a lost motion component, reset component and exhaust rocker with an engine brake in an engine environment and including a lost motion component reset trigger associated with the exhaust rocker.
Figure 9:
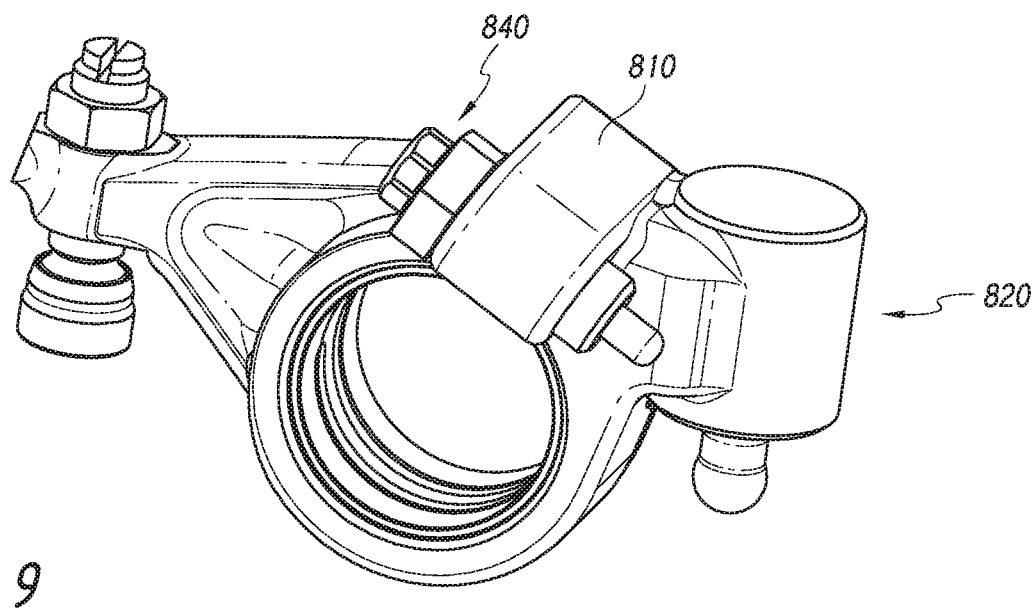
FIG. 9 is an isometric detailed view of the intake rocker depicted in FIG. 8.

FIGS. 8-14 illustrate a suitable system for such applications, with additional advantages. FIG. 8 is an isometric view of a system 810 for iEGR utilizing an intake rocker with a lost motion component 820 and a reset component assembly 840. Intake rocker 800 and exhaust rocker 850 are disposed on a rocker shaft 880. Intake rocker 800 includes a reset component housing 810 formed therein for housing the reset component assembly 840. As will be recognized with regard to this arrangement, when the reset is triggered, the rocker will move back towards the cam since the actuator piston is on the pushrod side. This motion will further depress the reset valve, thus resulting in even more rapid reset.

Figure 10:
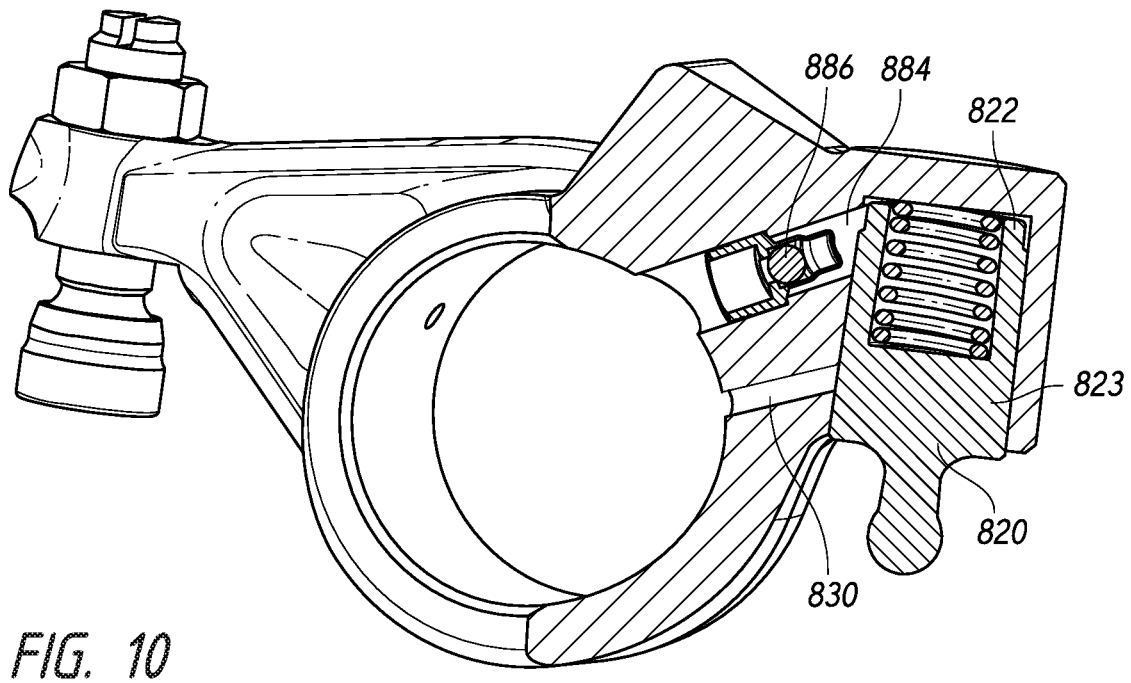
FIG. 10 is a cross-section of the intake rocker of FIG. 8 showing a control fluid supply passage to a lost motion component therein.
Figure 11:
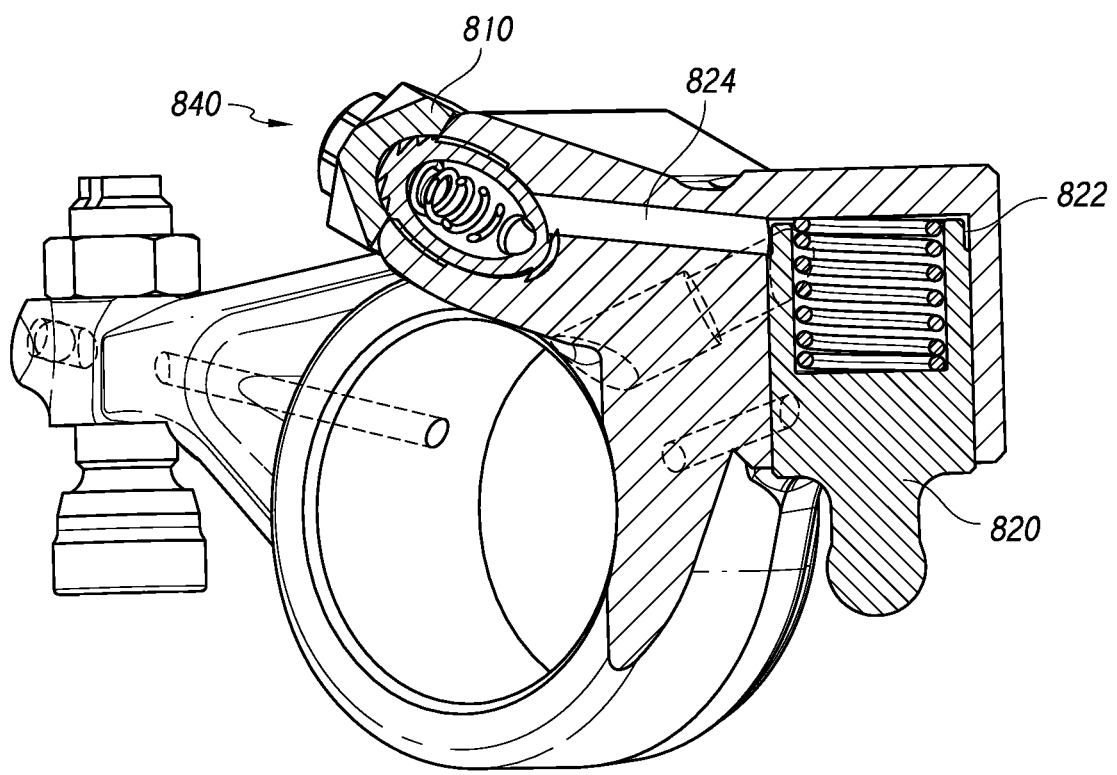
FIG. 11 is a cross-section of the intake rocker of FIG. 8 showing a reset control fluid passage to a reset component

A lost motion intake rocker 800 may include a reset component assembly 840 having a reset lash setting screw function. FIGS. 10 and 11 illustrate internal control fluid passages in the intake rocker, which constitute portions of a control fluid or hydraulic circuit. A control fluid passage 884 (FIG. 10) extends from the rocker shaft journal to the lost motion component control fluid bore 822. A check valve 886 may be disposed in the control fluid passage to prevent backflow. A lubrication passage 830 may provide lubricating fluid to the lost motion component piston 823 when it is not providing lost motion and is reciprocating.

Figure 12:
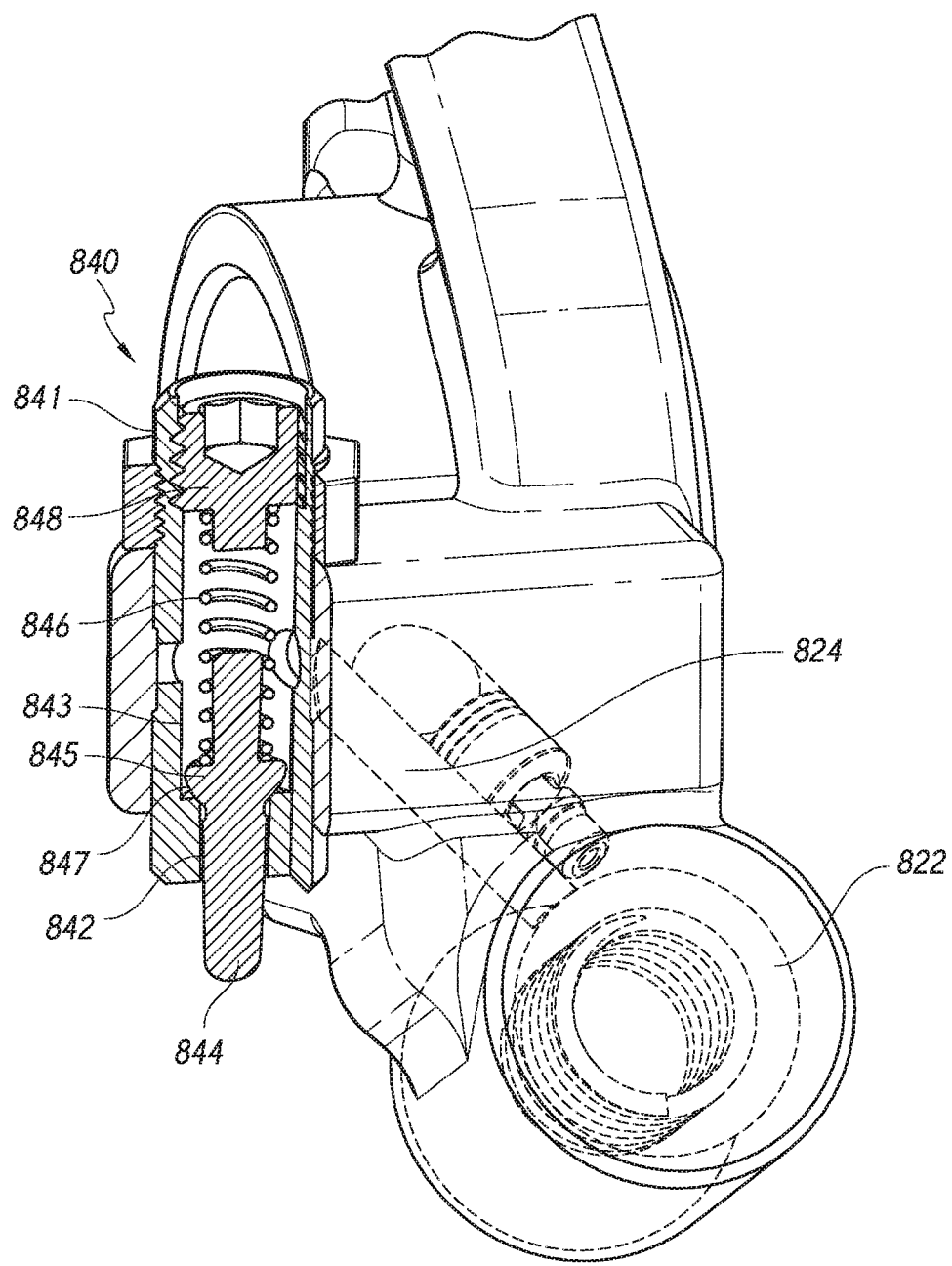
FIG. 12 is a cross-section of the intake rocker of FIG. 8 showing details of the reset component.

FIG. 11 is a partial sectional view showing a reset passage 824 extending within the reset component housing 810 from the lost motion component control fluid bore 822 to the reset component assembly 840. Referring additionally to FIG. 12, the reset component assembly 840 may include a generally cylindrical housing 841 having an exit port 842 defined in an end thereof and an internal housing bore 843. Housing bore 843 is in fluid communication with the reset passage 824 and contains a poppet valve 844 having poppet 845, which is biased by a spring 846 against a valve seat 847. A threaded spring retainer 848 may be adjustably secured within the housing 841 at an end opposite the exit port 842 to adjust the biasing force on the poppet valve 844.

FIGS. 13 and 13.1 illustrate a triggered or reset depressed position of the reset component 840. In FIG. 13, during the exhaust main event peak position of the exhaust rocker 850, a reset pad 854 extending away from the exhaust rocker 850 toward the intake rocker may contact the end of the poppet valve 844. As further detailed in FIG. 13.1, this contact lifts the poppet 845 off of the valve seat 847, thereby permitting control fluid to flow from the reset component, thus causing the lost motion component 820 to reset.

Figure 14:
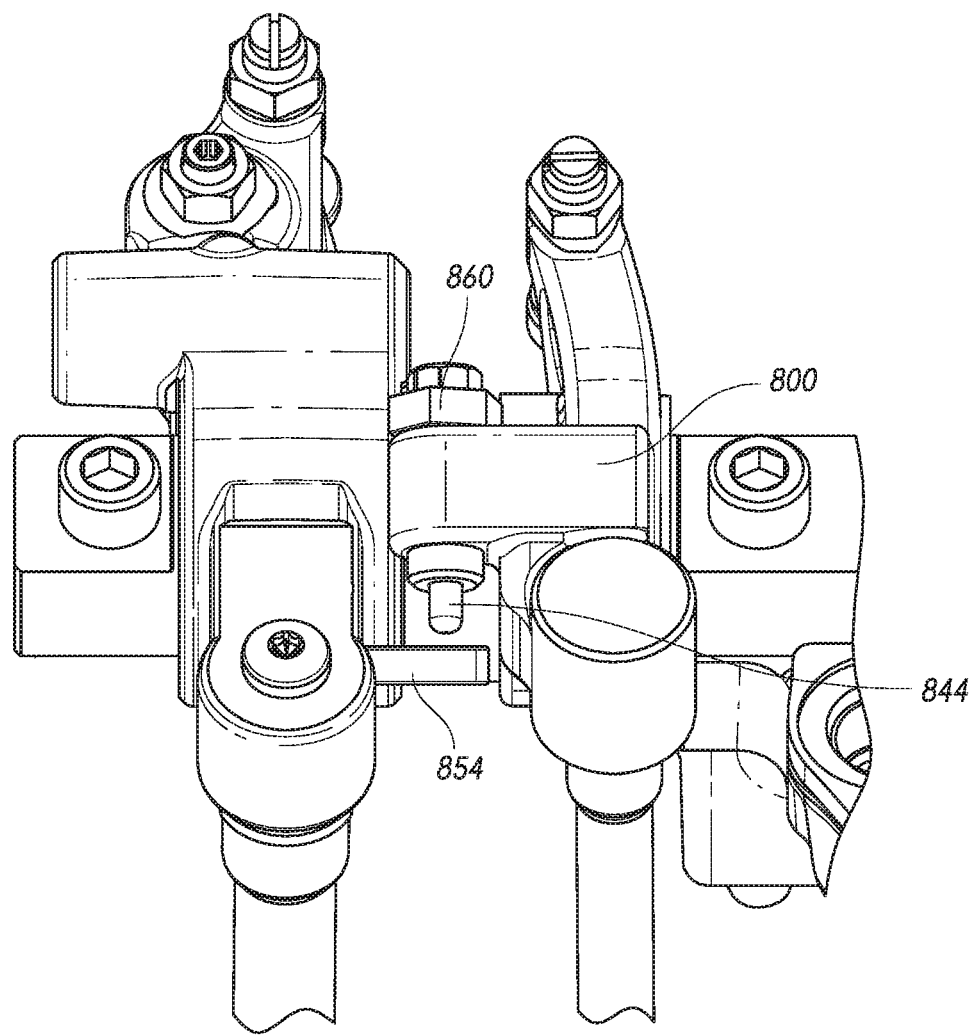
FIG. 14 is an isometric view of an iEGR system of FIG. 8 in a lash setting configuration.

FIG. 14 shows the intake rocker 800 on base circle with the reset component having lash set. Lash may be set using a threaded locking nut 860 which may be threadably engaged with an outer surface of the housing. A lash may be set between the end of the poppet valve 844 and the reset pad 854. The reset component 840 can be adjusted up and down by the internal hex in the threaded spring stop 848 that is intended to be tightly secured to the threaded housing 841. By moving the housing 841 up and down the precise height and therefore angle that the reset is triggered can be set to achieve a desired closure of the iEGR valve. Variation in iEGR closure can cause iEGR flow rate variation that may be outside the parameters needed for ideal control of NOx. After setting desired height of the assembly, the jam or lock nut 860 is tightened to lock the components in place.

The intake lift profile achieved with the embodiment of FIGS. 8-14 above is the same as that depicted in FIG. 4.

Figure 15:
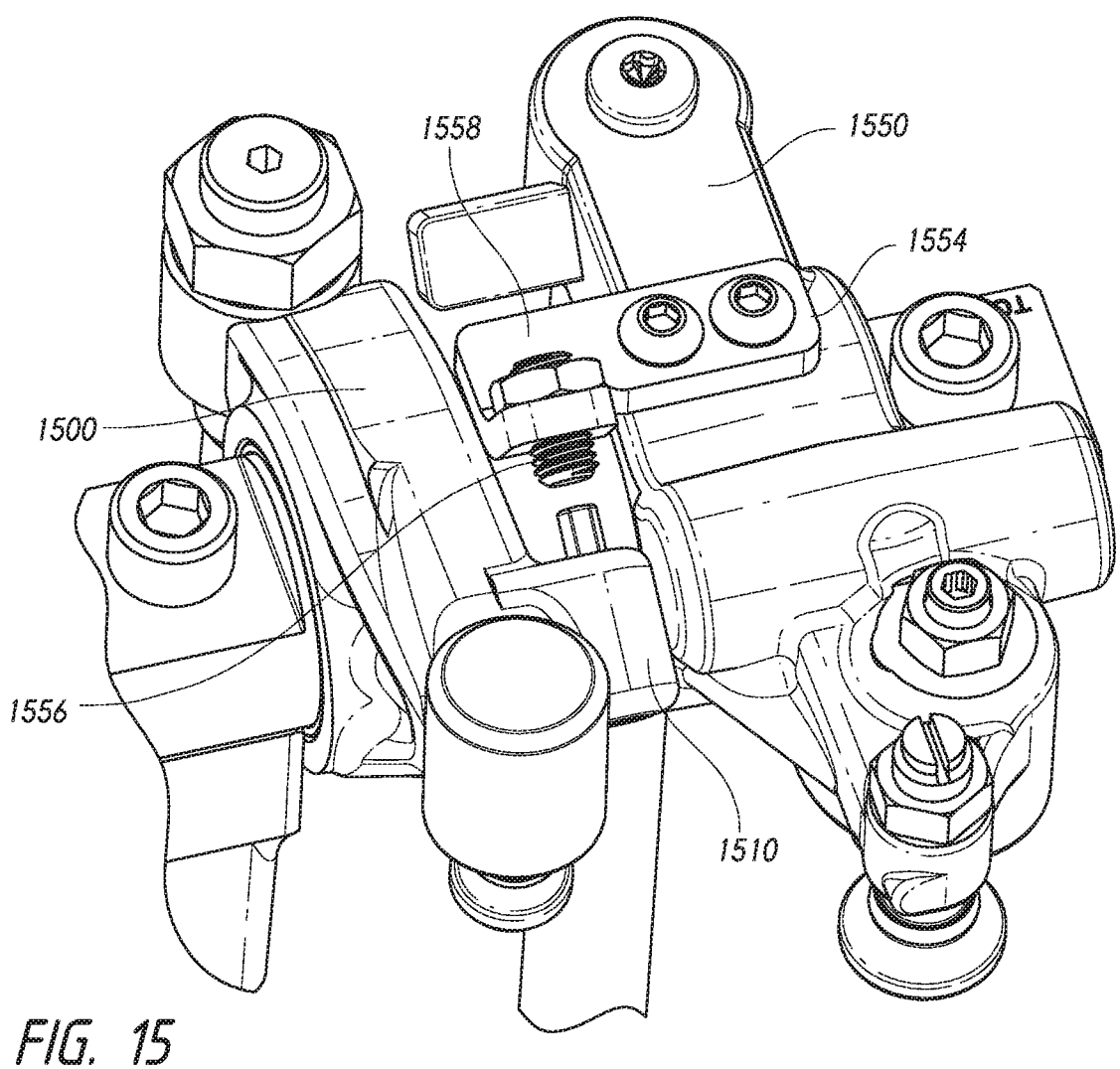
FIG. 15 is an isometric view of an iEGR system according to an alternative embodiment in which a reset component is disposed on a valve side of the intake rocker.
Figure 16:
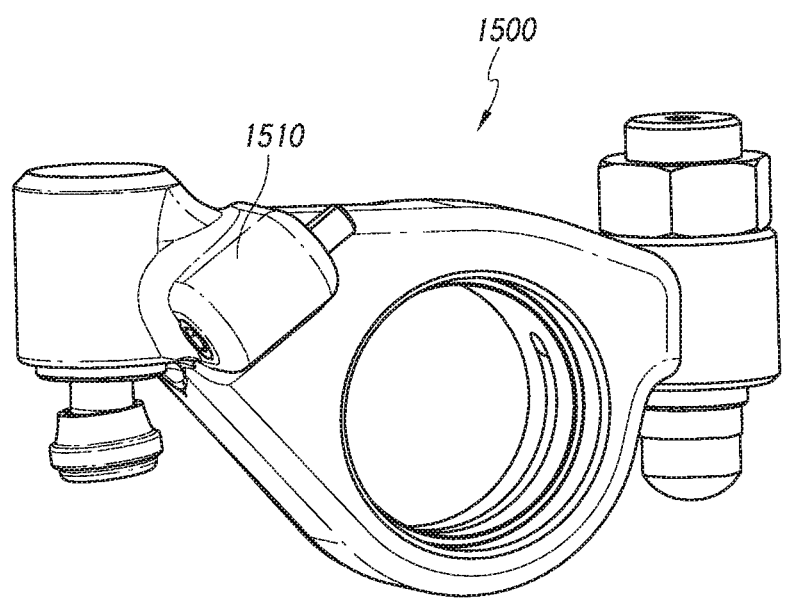
FIG. 16 is an isometric view of the intake rocker shown in the system of FIG. 15.
Figure 17:
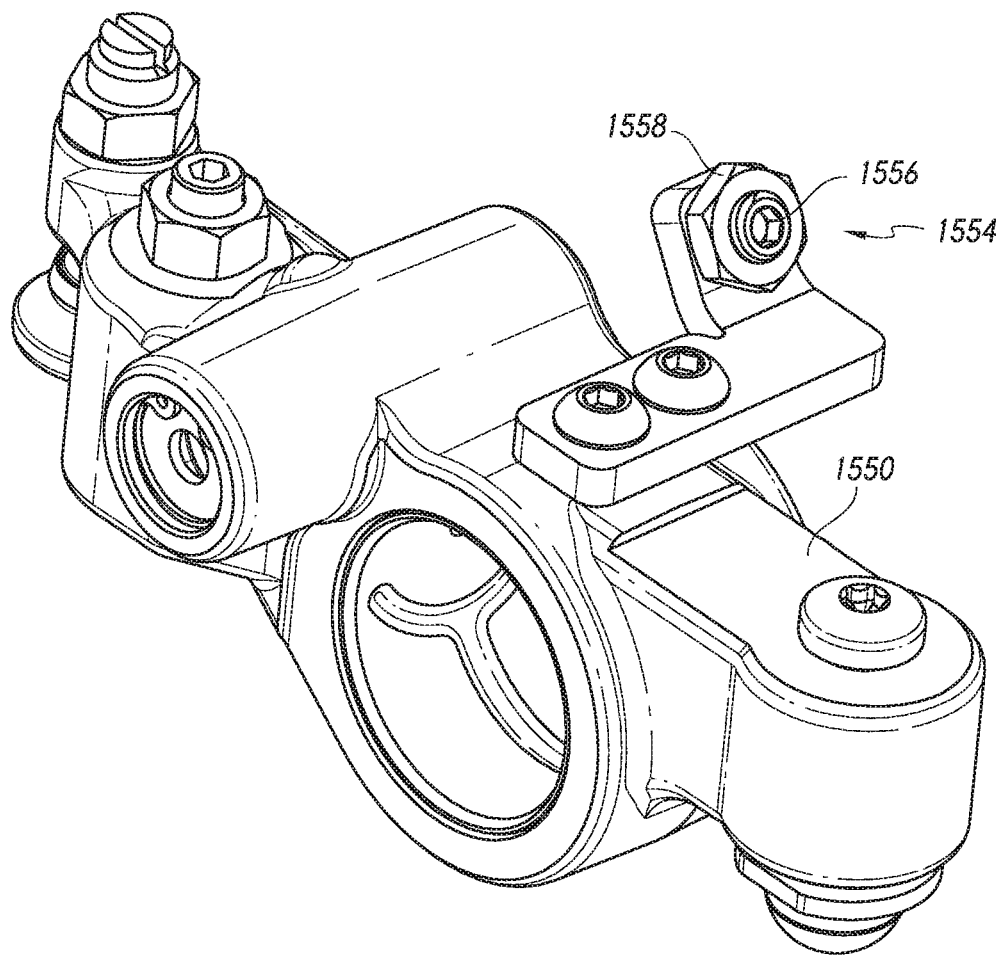
FIG. 17 is an isometric view of an exhaust rocker shown in the system of FIG. 15.

FIGS. 15-17 illustrates another example system for achieving iEGR in accordance with aspects of the disclosure. In this embodiment, the intake rocker 1500 may include a reset component housing 1510 on a valve side of the intake rocker. FIG. 16 further illustrates the orientation of the reset component housing 1510 and the reset pin or trigger extending therefrom. As can be seen in FIGS. 15 and 17, a reset arm 1554 may be secured to the exhaust rocker 1550 with threaded fasteners. A setscrew 1556 with a locking nut 1558 may be provided to allow lash setting as needed for timing the reset and for lift control. In this version the actuator piston is also on the valve side. As will be recognized, when the reset is tripped the rocker will not rotate back towards the cam, so the stroke of the reset will be only driven by the exhaust main event motion. This is better for the height based reset system where the rocker angle will be held constant during the resetting.

As will be recognized from the foregoing disclosure, an additional intake opening event near the beginning of the exhaust valve main event is a viable method to achieve EGR rates in the range of 35%.

As will be recognized, the systems described above may operate according to methods of performing iEGR. Methods according to aspects of the disclosure may include the step of providing exhaust gas recirculation in an internal combustion engine, the internal combustion engine comprising an exhaust valvetrain for conveying motion from an exhaust valve motion source to at least one exhaust valve; an intake valve motion source; an intake valvetrain for conveying motion from an intake valve motion source to at least one intake valve; a lost motion component in the intake valvetrain for selectively absorbing motion in the intake valvetrain; a control fluid circuit in communication with the lost motion component; a reset component for resetting the control fluid circuit; and a reset trigger for triggering the reset component, the method comprising: the method comprising: opening the exhaust valve during a main event power cycle of the engine; opening an intake valve to cause a secondary lift event during the exhaust valve opening; and operating the reset trigger to control the secondary intake valve lift during main event opening of the exhaust valve.

Although the present implementations have been described with reference to specific example embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A system for actuating at least one of two or more engine valves to provide exhaust gas recirculation in an internal combustion engine, the system comprising;
   an exhaust valvetrain component for conveying motion to at least one exhaust valve;
   an intake valve motion source;
   an intake valvetrain for conveying motion from the intake valve motion source to at least one intake valve, the intake valvetrain including an intake rocker;
   a lost motion component in the intake valvetrain for selectively absorbing motion in the intake valvetrain;
   a control fluid circuit in communication with the lost motion component;
   the intake rocker including a reset component for resetting the control fluid circuit; and
   a reset trigger for triggering the reset component, the reset trigger being disposed on the exhaust valvetrain component or fixed relative to motion of the intake rocker and being adapted to cooperate with the reset component to collapse the lost motion component at an appropriate time in an engine cycle to cause a secondary lift event in the at least one intake valve at a time near a start or end of a main exhaust event motion of the at least one exhaust valve and to thereby facilitate exhaust gas recirculation in the internal combustion engine.

2. The system of claim 1, wherein the exhaust valvetrain component is an exhaust rocker, wherein the reset trigger is cooperatively associated with the exhaust rocker.

3. The system of claim 1, wherein the reset component is disposed at least partially within the intake rocker, and wherein the reset trigger is arranged to be engaged by the reset component as a result of motion of the intake rocker.

4. The system of claim 1, wherein the reset component comprises a poppet valve.

5. The system of claim 1, wherein the reset component comprises a triggered vent.

6. The system of claim 1, wherein the reset component is adapted to reduce pressure in the control fluid circuit.

7. The system of claim 1, wherein at least one of the reset trigger and the reset component is adapted to be adjusted to set reset to correspond with a specific valve lift height.

8. The system of claim 1, wherein the lost motion component is disposed on a valve side of the intake rocker in the intake valvetrain.

9. The system of claim 1, wherein the lost motion component is disposed on a cam side of the intake rocker in the intake valvetrain.

10. The system of claim 1, wherein the lost motion component comprises a piston disposed in a bore in the intake rocker in the intake valvetrain.

11. The system of claim 10, wherein the lost motion component further comprises a biasing spring.

12. The system of claim 10, wherein the control fluid circuit communicates with the bore in the intake rocker.

13. The system of claim 1, wherein the intake valvetrain comprises an overhead rocker.

14. A method of providing exhaust gas recirculation in an internal combustion engine, the internal combustion engine comprising an exhaust valvetrain component for conveying motion to at least one exhaust valve; an intake valve motion source; an intake valvetrain for conveying motion from the intake valve motion source to at least one intake valve; a lost motion component in the intake valvetrain for selectively absorbing motion in the intake valvetrain; a control fluid circuit in communication with the lost motion component; the intake valvetrain including an intake rocker, the intake rocker including a reset component for resetting the control fluid circuit; and a reset trigger disposed on the exhaust valvetrain component or fixed relative to motion of the intake rocker and being adapted to cooperate with the reset component for triggering the reset component, the method comprising:
   opening the at least one exhaust valve during a main exhaust event of an internal combustion engine power cycle;
   resetting the reset component with the reset trigger at an appropriate time in the internal combustion engine power cycle to collapse the lost motion component, thereby opening the at least one intake valve to cause a secondary lift event during the at least one exhaust valve opening to facilitate internal exhaust gas recirculation in the internal combustion engine.

15. The method of claim 14, further comprising a step of triggering the reset component in response to motion of the intake rocker.

16. The method of claim 14, wherein the exhaust valvetrain further comprises an exhaust rocker, the method further comprising a step of triggering the reset component by motion of the exhaust rocker.

17. The method of claim 14, further comprising a step of resetting the control fluid circuit using a poppet valve.

18. The method of claim 14, further comprising a step of adjusting at least one of the reset component or the reset trigger to correspond with a specific valve lift height.

19. A system for actuating at least one of two or more engine valves to provide exhaust gas recirculation in an internal combustion engine, the system comprising;
   an intake valvetrain for conveying motion from an intake valve motion source to at least one intake valve, the intake valvetrain including an intake rocker;
   an exhaust rocker for conveying motion to at least one exhaust valve;
   a lost motion component in the intake rocker for selectively absorbing motion in the intake valvetrain;
   a control fluid circuit in communication with the lost motion component;
   the intake rocker including a reset component for resetting the control fluid circuit; and
   a reset trigger, disposed on the exhaust rocker, for triggering the reset component in response to relative movement between the exhaust rocker and the intake rocker, the reset trigger cooperating with the reset component to control intake valve motion and support exhaust gas recirculation of the internal combustion engine.

* * * * *